US010353918B2

United States Patent
Qi et al.

(10) Patent No.: US 10,353,918 B2
(45) Date of Patent: Jul. 16, 2019

(54) HIGH AVAILABILITY AND DISASTER RECOVERY IN LARGE-SCALE DATA WAREHOUSE

(71) Applicant: Amobee, Inc., Redwood City, CA (US)

(72) Inventors: Yan Qi, Fremont, CA (US); Mingxi Wu, San Mateo, CA (US)

(73) Assignee: Amobee, Inc., Redwood City, CA (US)

( * ) Notice: Subject to any disclaimer, the term of this patent is extended or adjusted under 35 U.S.C. 154(b) by 440 days.

(21) Appl. No.: 14/535,577

(22) Filed: Nov. 7, 2014

(65) Prior Publication Data

US 2016/0132576 A1    May 12, 2016

(51) Int. Cl.
*G06F 16/20* (2019.01)
*G06F 16/27* (2019.01)

(52) U.S. Cl.
CPC .................... *G06F 16/27* (2019.01)

(58) Field of Classification Search
CPC ............. G06F 17/30575; G06Q 10/08
See application file for complete search history.

(56) References Cited

U.S. PATENT DOCUMENTS 8,032,508 B2   10/2011   Martinez et al.
2005/0015657 A1*   1/2005   Sugiura ............... G06F 11/1482
                                                   714/6.12
2009/0006888 A1*   1/2009   Bernhard .............. G06F 11/08
                                                   714/6.12
2013/0318221 A1*  11/2013   Anaya ................. G06F 9/505
                                                   709/223

OTHER PUBLICATIONS

Andrew Crotty et al., Tupleware: Redefining Modern Analytics, Jun. 25, 2014 [retrieved on Apr. 2, 2018], pp. 1-12. Retrieved from the Internet: https://arxiv.org/abs/1406.6667v1 (Year: 2014).*
Lau, Edmond et al., "An integrated approach to recovery and high availability in an updatable, distributed data warehouse", E. Lau and S. Madden. An integrated approach to recovery and high availability in an updatable, distributed data warehouse. In Proceedings of the 32nd International Conference on Very Large Data Bases, VLDB '06, pp. 703-714. VLDB Endowment, 2006., http://www.vldb.org/conf/2006/p703-lau.pdf, Sep. 2006, 12 pages.

(Continued)

*Primary Examiner* — Kristopher Andersen
(74) *Attorney, Agent, or Firm* — Kwan & Olynick LLP

(57) ABSTRACT

Techniques and mechanisms described herein facilitate the management of data centers. According to various embodiments, a first query dispatcher at a first data center may be disabled. The first data center may include a first data cluster and a first database. The first query dispatcher may be configured to dispatch queries to access data in the first data cluster and in a second data cluster at a second data center. The second data cluster may replicate data stored in the first data cluster. Metadata stored in the first database may be replicated to a second database in the second data center. The metadata may describe a state of the first data cluster. A second query dispatcher may be enabled at the second data center. The second query dispatcher may be configured to dispatch queries to access data in the second data cluster.

11 Claims, 6 Drawing Sheets

(56) References Cited

OTHER PUBLICATIONS

Mohan, Haderle B. et al., "A transaction recovery method supporting ne-granularity locking and partial rollbacks using write-ahead logging", Mohan, D. Haderle, B. Lindsay, H. Pirahesh, and P. Schwarz. Aries: A transaction recovery method supporting ne-granularity locking and partial rollbacks using write-ahead logging. ACM Transactions on Database Systems, 17:94-162, 1992., http://db.csail.mit.edu/madden/html/aries.pdf, Mar. 1992, 69 pages.

* cited by examiner

HIGH AVAILABILITY AND DISASTER RECOVERY IN LARGE-SCALE DATA WAREHOUSE

TECHNICAL FIELD

The present disclosure relates generally to data warehousing, and more specifically to data availability and disaster recovery.

DESCRIPTION OF RELATED ART

Data warehouses may occasionally be subject to disasters that disrupt normal operations. Data warehouses are frequently divided into geographically separate sites. In conventional systems, when a disaster occurs on one side, a disaster recovery system may use a reliable replication service to copy a snapshot of the data and the commit logs to the recovery site. Then, a log processor on that site may scan the log linearly and perform efficient point updates to catch up with the changes.

However, in the era of Big Data, the size of the data storage becomes so large that recovery from a disaster, such as the power outage of a data center, becomes very difficult. Conventional transaction-oriented High Availability (HA) and Disaster Recovery (DR) systems rely on a write-ahead commit log to record the system state. In such systems, the recovery process will work only if the log processing procedure is faster than the incoming change requests. However, a commit log based approach hardly works for big data system, where terabytes of non-transactional daily changes are normal. Also, large data centers are often employed for cloud based software service, which may require an always-on or high availability commitment.

Big data management is distinct from traditional data warehouse especially in scale and data residency. In many industries, petabytes or even exabytes data are now collected and stored on a data cluster of commodity personal computers using technology such as Hadoop. A common function is applied on each data cluster node to form the basic query processing operation. Such big data systems commonly ingest terabytes of data daily without the transactional semantics requirement, and do not support efficient point record update functionality.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide techniques and mechanisms for facilitating the management of data centers. According to various embodiments, a first query dispatcher at a first data center may be disabled. The first data center may include a first data cluster and a first database. The first query dispatcher may be configured to dispatch queries to access data in the first data cluster and in a second data cluster at a second data center. The second data cluster may replicate data stored in the first data cluster. Metadata stored in the first database may be replicated to a second database in the second data center. The metadata may describe a state of the first data cluster. A second query dispatcher may be enabled at the second data center. The second query dispatcher may be configured to dispatch queries to access data in the second data cluster.

According to various embodiments, the metadata may describe a state of the second data cluster. A first cluster monitor at the first data center configured to monitor the first data cluster and the second data cluster and store the metadata in the first database may be deactivated.

According to various embodiments, the first cluster monitor may also be configured to monitor the second data cluster. A second cluster monitor at the second data center configured to store the metadata in the second database may be activated.

According to various embodiments, a failure condition indicating that the first data cluster is no longer available may be detected. A first console at the first data center configured to receive query input information and store the query input information in the first database may be deactivated. A second console at the second data center configured to receive query input information and store the query input information in the second database may be activated.

According to various embodiments, the metadata may describe query status information designating a completion status associated with a query stored in the first database and/or a computing load associated with the first data cluster.

According to various embodiments, a first data ingestion component at the first data center configured to receive data from one or more data sources, transform the data for storing in the first data cluster, and load the transformed data into the first data cluster may be disabled. A second data ingestion component at the second data center configured to receive data from one or more data sources, transform the data for storing in the second data cluster, and load the transformed data into the second data cluster may be enabled.

According to various embodiments, data ingestion state information identifying which data has been replicated from the first data cluster to the second data cluster may be transmitted from the first data ingestion component to the second data ingestion component. The data ingestion state information may include a checkpoint indicating a break in input data past which the input data has been replicated from the first data cluster to the second data cluster. Alternately, or additionally, the data ingestion state information may include an input data cache that stores data that has not yet been replicated from the first data cluster to the second data cluster

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
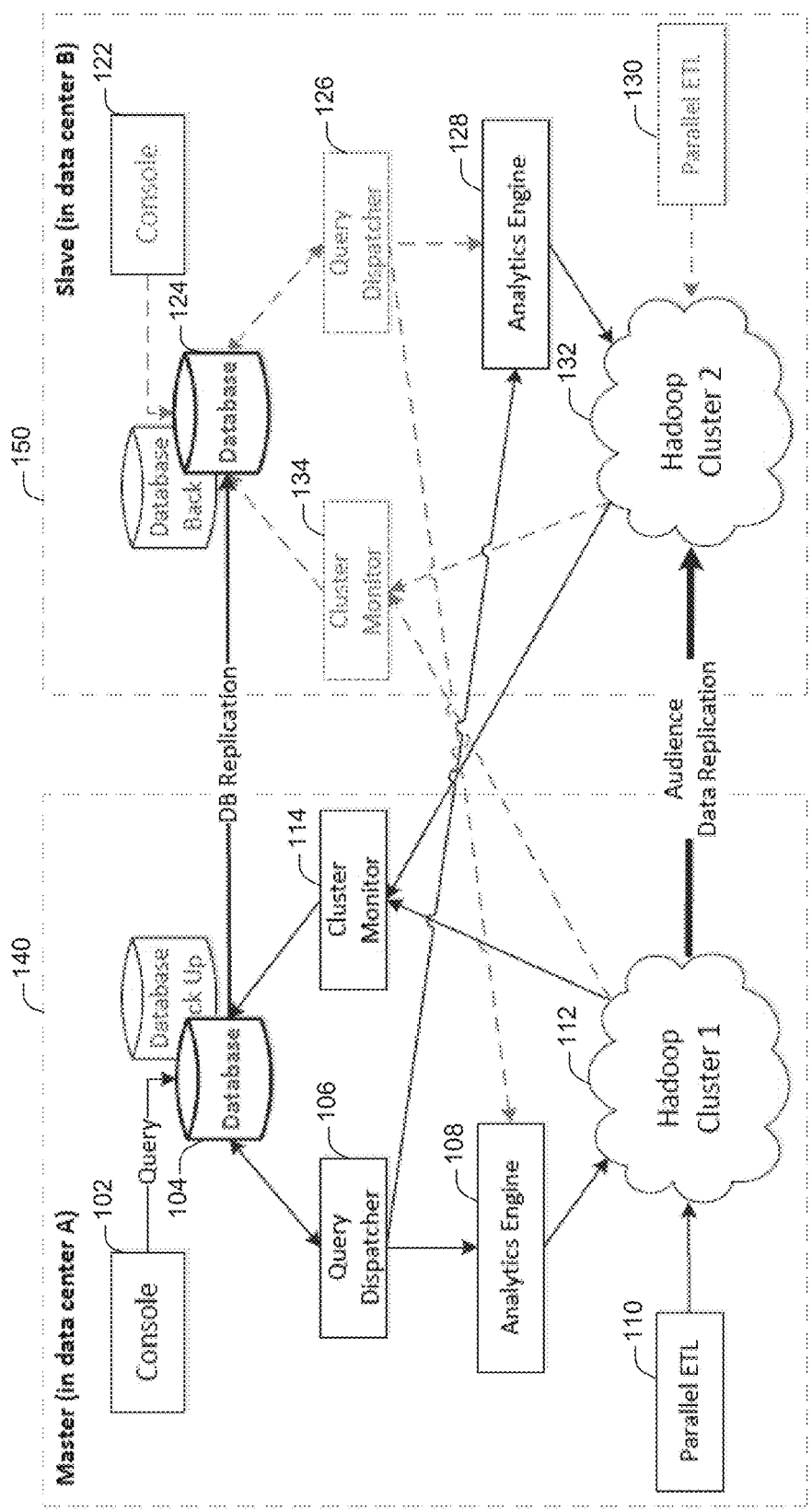
FIG. 1 illustrates a system for redundant data warehousing, configured in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular techniques and mechanisms related to advertising campaigns. However, it should be noted that the techniques and mechanisms of the present invention apply to a variety of different computing techniques and mechanisms. In the following description, numerous specific details are set forth in order to provide a thorough understanding of the present invention. Particular example embodiments of the present invention may be implemented without some or all of these specific details. In other instances, well known process operations have not been described in detail so as not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein facilitate an integrated approach to recovery and high availability in a large-scale data warehouse system. For instance, the data warehouse system may handle petabytes, exabytes, or more of data. The system may employ a geographically apart master-slave architecture. To achieve large scale data replication consistency, the system may include a stage data replication model implemented at the user-level and/or the late-ETL (Extract, Transform, Load) level. A map-reduced based replication implementation may copy data in their native residence from the source to the destination. In some implementations, the architecture may provide always-on service and recovery for scenarios including network, data cluster, and data site failures.

Example Embodiments

According to various embodiments, techniques and mechanisms described herein may facilitate the configuration of a HDFS (Hadoop distributed file system) as a resident large scale data warehouse substantial query throughput. The system may be configured to be both high availability and capable of disaster recovery.

In conventional transactional-based relational data warehouses, one approach to disaster recovery is based on commit log. For example in for the Algorithm for Recovery and Isolation Exploiting Semantics (ARIES) system, when a disaster happens in a site, the system uses a reliable replication service to copy the latest checkpoint of the database image to the recovery site, as well as the commit logs to the recovery site, and a log processor on that site scans the log linearly and does efficient updates to catch up with the changes.

In conventional transaction-based relational data warehouses, another approach to disaster recovery is the High Availability and Replication-Based Online Recovery (HARBOR) system, which is designed for read-mostly and updatable Online Analytical Processing (OLAP) system. The recovery approach in HARBOR system works by means of a checkpoint-and-incremental-query approach based on time stamp.

These conventional transaction-based relational data warehouses treat transactional semantics as a key requirement and are built on the premise that data replication or network communication is not a major issue either via high speed local network area (LAN) connection or a commercial grade data replication software. They also assume that an efficient point update mechanism, such as a global index, is in place. However, these assumptions do not apply in the big data context. Big data management is distinct from traditional data warehouse especially in scale and data residency. Many big data resides on HDFS. Such big data systems commonly ingest terabytes of data daily without the transactional semantics requirement. Also, such big data systems commonly do not support efficient point record update functionality.

In contrast to these conventional techniques, the techniques and mechanisms described herein may support the configuration of an industrial-strength large scale always-on data warehouse system that may be configured to meet service-level-agreements (SLAs). According to various embodiments, the system may include any or all of various features. For example, the system may include a geographically apart master-slave architecture for large scale Hadoop-based data warehouse, supporting high availability and data recovery. As another example, the system may include a user level and thus a late-ETL stage data replication model to achieve data replication consistency and high compression opportunity. As yet another example, the system may include an Map-Reduce-based efficient replication implementation guaranteeing SLA. As still another example, the system may include data cluster monitoring and workload balancing components optimized for multi-site data warehouse query throughput.

In some implementations, techniques and mechanisms may be described herein as solving "optimization" problems or as "optimizing" one or more parameters. It should be noted that the term optimize does not imply that the solution determined or parameter selected is necessarily the best according to any particular metric. For instance, some optimization problems are computationally intense, and computing the best solution may be impractical. Accordingly, optimization may involve the selection of a suitable parameter value or a suitably accurate solution. In some instances, the suitability of a parameter value or solution may be strategically determined based on various factors such as one or more computing capabilities, problem characteristics, and/or time constraints.

FIG. 1 illustrates a system for redundant data warehousing, configured in accordance with one or more embodiments. The system shown in FIG. 1 may be used to receive large amounts of data for storage at a first data center site 140. The stored data may be replicated to a second data center site 150. The data center sites may communicate via high-speed network links. The stored data may also be made available for querying.

According to various embodiments, the system shown in FIG. 1 includes redundant components that are each positioned in a respective data center site. For instance, the data centers include consoles 102 and 122, databases 104 and 124, query dispatchers 106 and 126, cluster monitors 114 and 134, analytics engines 108 and 128, data clusters 112 and 132, and parallel ETLs 110 and 130.

According to various embodiments, the data centers may be configured in a master/slave architecture. In the configuration shown in FIG. 1, the first data center site 140 is configured as the master data center while the second data center site 150 is configured as the slave data center. Although the system shown in FIG. 1 includes only two data centers in communication in a single master/slave relationship, other configurations may include various numbers of data centers arranged in various relationships.

In some implementations, the master data center in a master/slave relationship may be responsible for primary data center responsibilities such as ingesting new data, receiving queries to query stored data, dispatching queries to the data clusters, and monitoring the data clusters. The slave data center may be responsible for receiving and storing replicated data transmitted from the master data center. The slave data center may also be configured to execute queries on data stored in the slave data center. In this way, the slave data center may store an up-to-date copy of the data stored in the primary data center while providing load balancing for queries to the data.

In some implementations, one or more components in a slave data center may be placed in a disabled or deactivated state. For instance, in the system shown in FIG. 1, the console 122, the cluster monitor 134, the query dispatcher 126, and the parallel ETL 130 are placed in a disabled or deactivated state. When a component is placed in such a state, the functioning of the component may be suspended. However, the component may be ready to resume functioning upon request, for instance if one or more primary data operations are transferred from one data center to the other data center.

At each of 102 and 122, a console is shown. According to various embodiments, the console may be responsible for receiving requests to query the data stored in the data center. For instance, the console may receive requests to retrieve, alter, summarize, or otherwise analyze records stored in the data center.

At each of 104 and 124, a database is shown. According to various embodiments, the database may store any information related to the data stored in the data centers and/or the data clusters on which the data is stored. For example, the database may store queries received from the console. As another example, the database may store results of the queries received from the console and executed on the data cluster. As yet another example, the database may store data cluster status information describing an operating status of the data cluster.

In particular embodiments, the database may be associated with one or more backups. A backup database may be used to continue operations in the event of failure at the primary database. Alternately, or additionally, a backup database may be used to restore the primary database to an earlier state.

In particular embodiments, the database at the master data center may be replicated to the slave data center. The database replication may be performed via any suitable database replication technology. By replicating the database from the master data center to the slave data center, the slave data center may have a stored copy of queries, query results, and data cluster status information in the event of failure of either the master database or the entire master data center site.

At each of 106 and 126, a query dispatcher 106 is shown. According to various embodiments, the query dispatcher may be configured to retrieve queries from the database 104. The query dispatcher may also be configured to update status information for queries stored in the database. For example, the query dispatcher may update query status information to indicate that a query has been removed from a queue and is now being executed. As another example, the query dispatcher may update query status information to indicate that a query has been completed.

In some implementations, a query dispatcher may be configured to perform load balancing to execute queries on either the master or slave data cluster. For instance, the query dispatcher may retrieve cluster status information from the database 104 and determine whether the master or slave data cluster is better suited to execute a new query. When the query dispatcher selects which data cluster should execute a new query, the query dispatcher may transmit the query to the analytics engine associated with the selected data cluster. For instance, the query dispatcher 106 may transmit the query to the analytics engine 108 at the master data center or the analytics engine 128 at the slave data center.

At each of 108 and 128, an analytics engine is shown. According to various embodiments, the analytics engine may be configured to receive queries from a query dispatcher for execution on the data cluster. When a query is received, the analytics engine may execute the query on the data cluster. Executing the query may involve retrieving or altering information stored on the data cluster.

At each of 112 and 132, a data cluster is shown. The data cluster may include one or more storage servers working together to provide performance, capacity, and reliability. In many configurations, the data cluster may include many different storage servers that together provide petabytes, exabytes, or more of storage space. The data clusters shown in FIG. 1 are configured to use the open-source Apache Hadoop framework. However, any storage framework suitable for storing and accessing large amounts of data may be employed. For instance, a data cluster may be implementing using a framework such as Spark, Stratosphere, or Zillabyte.

According to various embodiments, the data cluster may store any of various types of information. For example, in one configuration the data cluster may store advertising analytics information that includes user data for advertising audience members. Such data may include user demographics information and/or user responses to digital advertisements. However, in other configurations the data cluster may store any type of high-volume data suitable for storage in a data storage cluster.

At each of 110 and 130, a parallel ETL is shown. In some implementations, the data may be ingested in to the data cluster via the parallel ETL. The parallel ETL may be responsible for extracting data from homogenous or heterogeneous data sources, transforming the data for storing it in the proper format in the data cluster, and loading it into the data cluster.

In particular embodiments, the parallel ETL may be configured to perform one or more different storage operations simultaneously. For instance, while data is being pulled in by one process, another transformation process may process the received data. Then, the data may be loaded into the data cluster as soon as transformed data is available for loading, without waiting for either or both of the earlier processes to be completed.

According to various embodiments, data may be replicated from the master data center cluster to the slave data center cluster. For example, data may be transferred from the master data center cluster to the slave data center cluster periodically, such as once every hour. As another example, data may be transferred when a calculated difference in the data stored on the two data clusters reaches a designated threshold. The data may be transfer via any suitable technique for replicating data, such as in one or more compressed data storage containers.

At each of 114 and 134, a cluster monitor is shown. According to various embodiments, the cluster monitor may be configured to receive information from one or both of the master data cluster and the slave data cluster. The information may include metadata that characterizes the contents and operations of the data cluster. For example, the cluster monitor may be configured to receive query results from the data cluster and store the query results in the database. As another example, the cluster monitor may be configured to receive status information from the data cluster that indicates the current processing load of the data cluster, the operational status of the data cluster, or other such information. For instance, the cluster may transmit to the cluster monitor an indication as to whether the data cluster is fully operational or whether one or more portions of the data cluster have failed. As another example, the cluster monitor may be configured to receive data storage information such as space usage, a number of files stored, a number of queries being executed, or other such information.

According to various embodiments, the system shown in FIG. 1 may be configured for disaster recovery and high availability. For example, the system may be capable of gracefully responding to a failure of either one or more components at the master data center and/or the entire master data center.

According to various embodiments, the components shown in FIG. 1 may be implemented in software, hardware, or a combination thereof. In some instances, a component may be implemented in specialized hardware configured to perform particular data processing tasks. For example, any or all of the console 102, the database 104, the query dispatcher 106, the analytics engine 108, the cluster monitor 114, and the parallel ETL 110 as well as their counterparts in the slave data center may be implemented as customized hardware components configured to perform specific data processing tasks.

In some implementations, any of the components shown in FIG. 1 may be backed up by duplicate components ready to take over in the event of failure of the primary component.

According to various embodiments, a data center may experience any of various types of failures, all of which the techniques and mechanisms described herein may be used to address. These failures may include, but are not limited to: network failures, power failures, cooling failures, data cluster failures, hardware failures, software failures, or catastrophic failures of an entire data center.

In some implementations, the components within a data center may communicate via high speed network links such as 100 gigabit, 1 terabit Ethernet, or even faster connections. Components across data centers may communicate via customized high speed network links or via public networks such as the Internet.

Figure 2:
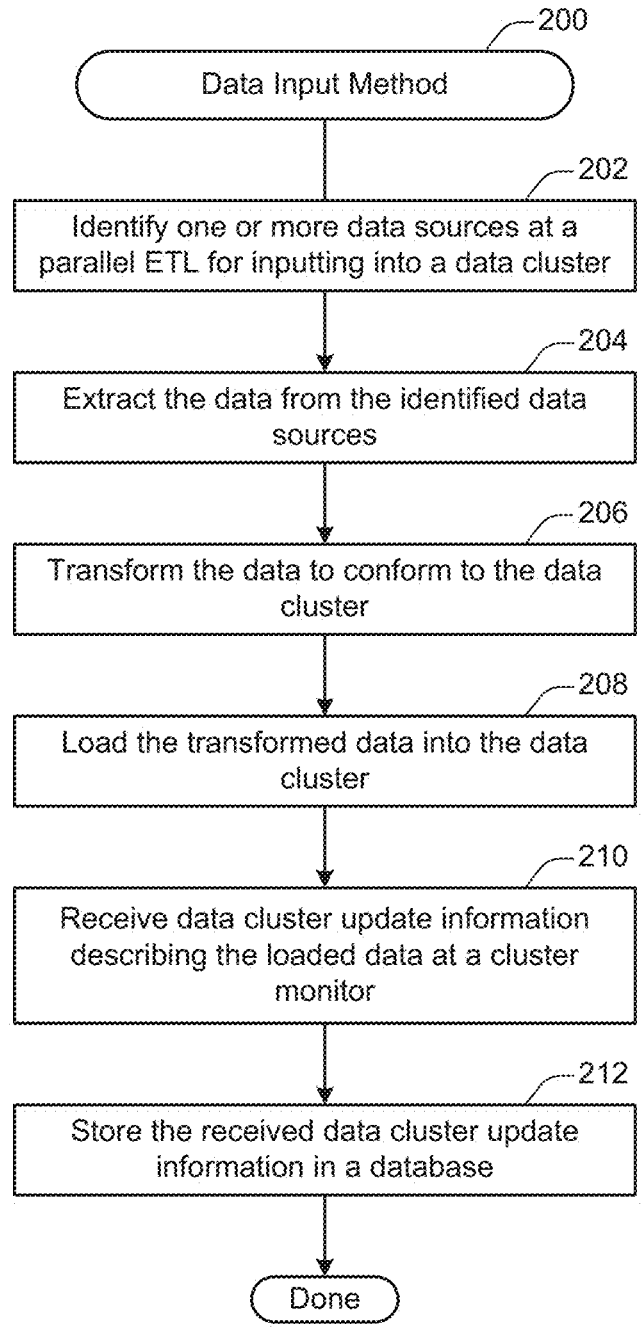
FIG. 2 illustrates a method for inputting data into a data cluster, performed in accordance with one or more embodiments.

FIG. 2 illustrates a method 200 for inputting data into a data cluster, performed in accordance with one or more embodiments. The method 200 may be performed at a data center configured to manage a data cluster such as the master data center 140 or the slave data center 150 shown in FIG. 1. For instance, the method 200 may be performed at the parallel ETL in communication with the data cluster 112, the cluster monitor 114, and the database 104.

At 202, one or more data sources at a parallel ETL are identified for inputting data into a data cluster. According to various embodiments, a data source may be located internally or externally to the data center. In some instances, a single data source may be used. Alternately, data from more than one data source may be aggregated and transformed for inputting into the data cluster.

In some implementations, data sources may be identified by consulting a list of data sources for receiving new input data. Data sources may be identified at periodic intervals, upon request, or when a trigger condition is met. For instance, data sources may be identified when the parallel ETL has unused capacity for receiving, processing, and loading input data.

At 204, the data is extracted from the identified data sources. According to various embodiments, extracting the data from a data source may involve transmitting a request for the data to the data source for input data. Then, input data may be received at the parallel ETL and stored for processing. For instance, the input data may be stored in an input buffer at the parallel ETL.

At 206, the input data is transformed to conform to the data cluster. According to various embodiments, transforming the input data may involve any operations for formatting the data in accordance with parameters and storage structure information that indicate how data is stored on the data cluster. For instance, data stored on the data cluster may be arranged in particular folder hierarchies or other structures so that the data may be rapidly identified and retrieved when processing queries. Accordingly, transforming the input data may involve operations such as decoding, decrypting, encoding, deduplicating, filtering, or reformatting, harmonizing, or otherwise processing the input data.

In particular embodiments, the transformed data may be stored as output data at the parallel ETL. For instance, the output data may be stored in an output buffer for loading into the data cluster.

At 208, the transformed data is loaded into the data cluster. According to various embodiments, loading the transformed data into the data cluster may involve determining a storage location for the transformed data in the data cluster. For instance, the parallel ETL may communicate with one or more components in the data center to determine an appropriate storage location. When a location is designated, the transformed data may be copied from an output buffer in the parallel ETL 110 to the designated location within the data cluster 112.

At 210, data cluster update information describing the loaded data is received at a cluster monitor. According to various embodiments, the update information may be received at the cluster monitor 114 shown in FIG. 1. The update information may allow the cluster monitor to determine which data is available on the data cluster. For example, the update information may include metadata such as timestamps, folder hierarchy information, and/or hash values for the all or a portion of the loaded data.

In some implementations, the data cluster update information may include cluster status information that indicates an operating status of the data cluster. For example, the data cluster update information may indicate whether the data cluster is operating normally or whether some portion of the data cluster is down. A minor failure such as a disk failure in a portion of the data cluster may be remediable, for instance by replacing the failed disk. However, a major failure may mean that the data cluster is no longer available to respond to queries. The detection of such a failure may trigger a disaster recovery method such as the methods discussed with respect to FIGS. 4 and 5.

At 212, the received data cluster update information is stored in a database. According to various embodiments, the data cluster update information may be stored in the database 104. Thus, the database 104 may store information that characterizes which data is available in the storage cluster.

In particular embodiments, data received at the master data cluster 112 may be replicated to the slave data cluster 132. For instance, incremental data updates may be transmitted at periodic intervals or when a difference in data stored on the two data clusters reaches a threshold value.

According to various embodiments, when data is replicated to the slave data cluster, the cluster monitor 114 may receive data cluster update information describing the loaded data on the slave data cluster as well. In this way, the cluster monitor may be kept apprised of differences between the data stored on the master and slave data clusters.

Figure 3:
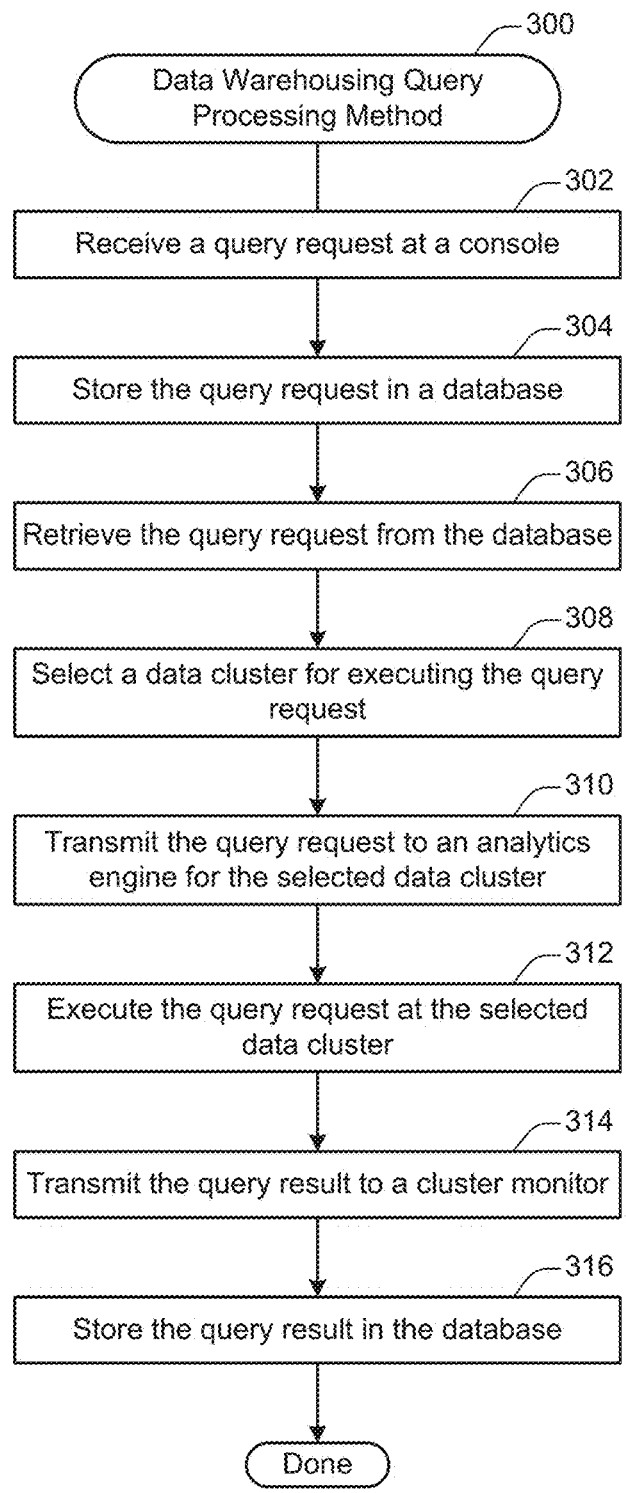
FIG. 3 illustrates a method for processing a query in a data warehouse, performed in accordance with one or more embodiments.

FIG. 3 illustrates a method 300 for processing a query in a data warehouse, performed in accordance with one or more embodiments. The method 300 may be performed at a data center configured to manage a data cluster such as the master data center 140 or the slave data center 150 shown in FIG. 1. The method 300 may be performed in order to alter and/or analyze data stored in a data cluster at the data warehouse. For instance, the method 300 may be performed to retrieve or analyze data from the data cluster 112 shown in FIG. 1.

At 302, a query request is received in a console, such as the console 102. According to various embodiments, the query request may be any data query for analyzing, altering, updating, retrieving, or otherwise processing data stored in the data cluster. The request may be generated manually or automatically. For example, the request may be received as user input. As another example, the request may be generated by a computer program configured to perform data analysis.

At 304, the query request is stored in a database such as the database 104. According to various embodiments, the database may be configured to store information about queries directed to the data cluster. For instance, the database may be configured to store the query itself, a status of the query, and/or the query result.

At 306, the query request is retrieved from the database, for instance by the query dispatcher 106. According to various embodiments, queries stored in the database may be associated with priority information. For instance, a query may be associated with a value indicating the time at which the query was received. In this way, the query dispatcher can retrieve the queries for execution in order of priority. For instance, the query dispatcher may use a first-in-first-out priority system or any other priority system suitable for processing queries.

At 308, a data cluster for executing the retrieved query request is selected. According to various embodiments, the data cluster may be selected based on information about the query and/or information about the different data clusters on which data is stored. For example, the complexity of the query may be analyzed and compared with data cluster availability information to determine which data cluster has sufficient unused capacity for handling the query. Complexity of a query may be determined by the number of columns and tables selected, the complexity of aggregate functions involved, and the size of input data, and/or the size of query result. The cost of a query job can be estimated based on the query complexity. The cluster availability information can be fetched from a database such as the database 104 such that the workload balance between the master cluster at 140 and the slave cluster at 150 may be achieved through assigning the new query job to the cluster that is less busy. As another example, the query may be analyzed to determine which data is necessary to access in order to respond to the query. Then, a determination may be made as to whether the necessary data is available on a particular data cluster.

At 310, the query request is transmitted to an analytics engine for the selected data cluster. For instance, the query request may be transmitted to the analytics engine 108 or the analytics engine 128.

At 312, the query request is executed at the selected data cluster. According to various embodiments, executing the query request may involve operations such as identifying the data necessary to execute the query, determining whether the identified data is located within the data cluster, and initiating one or more low level jobs in order to perform the necessary operations on the identified data. For instance, data may be retrieved, altered, or aggregated in order to execute the query.

At 314, the query result is transmitted to a cluster monitor such as the cluster monitor 114. In some implementations, the cluster monitor may receive various types of information. For example, the cluster monitor may receive job status information that indicates whether the query was executed successfully and, if not, an error status for the query. As another example, the cluster monitor may receive data generated in response to the query, such as one or more files. As yet another example, the cluster monitor may receive information about the data cluster itself, such as updated data cluster availability information.

At 316, the query result is stored in the database. According to various embodiments, the query result may be stored in the database so that information received by the cluster monitor is available for retrieval by any of various entities. For example, the query dispatcher may retrieve data cluster availability information in order to facilitate load balancing between the data clusters. As another example, the console or other output node may retrieve query result information to provide in response to the query request.

Figure 4:
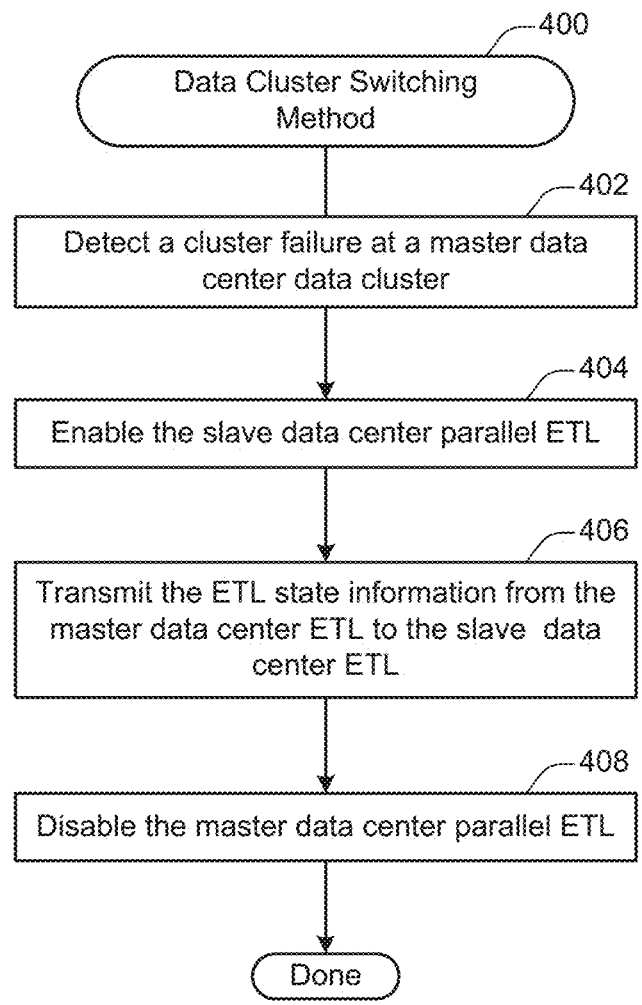
FIG. 4 illustrates a method for switching an active data cluster from one data center to another data center, performed in accordance with one or more embodiments.

FIG. 4 illustrates a method 400 for switching an active data cluster from one data center to another data center, performed in accordance with one or more embodiments. For example, two data centers each having a data cluster may be arranged in a master/slave relationship as shown in FIG. 1. If a failure renders the data cluster at the master data center unavailable, the system may shift data input and querying to the data cluster at the slave data center.

According to various embodiments, the master data center may ingest large amounts of data, commonly in the range of petabytes or exabytes, every day. At the same time, the master data center may receive, execute, and respond to any number of queries for the data stored at the data center. Nevertheless, the method shown in FIG. 4 may allow data ingestion operations to be rapidly and gracefully transferred between data centers while maintaining high availability and minimizing or completely avoiding downtime, primary data loss, and query data loss.

At 402, a cluster failure at a master data center data cluster is detected. According to various embodiments, the cluster failure may be detected at a cluster monitor such as the cluster monitor 114 shown in FIG. 1. The cluster failure may be any problem in software and/or hardware that renders the data center unavailable. For example, the cluster failure may include one or more software errors or data corruption events. As another example, the cluster failure may include power or network failure within the data center. As yet another example, the cluster failure may include component failure in which one or more key components for operating the data cluster become unavailable.

At 404, the parallel ETL at the slave data center is enabled. According to various embodiments, enabling the parallel ETL may involve transmitting a message from the cluster monitor to the parallel ETL indicating that the parallel ETL 130 should transition from an inactive state to an active state. When the parallel ETL 130 is enabled, it is made ready to begin extracting, transforming, and loading data into the slave data cluster 132.

At 406, ETL state information is transmitted from the master data center ETL to the slave data center ETL. According to various embodiments, the state information may be stored and transmitted in any suitable format for informing the slave ETL as to which data has been loaded into the master ETL but not yet transferred to the slave ETL.

In some embodiments, the ETL state information may include an ETL cache. The ETL cache may store data that has been loaded into the master data cluster 112 but not yet transmitted to the slave data cluster 132 via data replication. In such a configuration, data may be written to the ETL cache after it is transformed at the master data center parallel ETL 110. Then, the ETL cache may be flushed after the data stored in the ETL cache has not only been loaded into the master data cluster 112 but also replicated to the slave data cluster 132. When the slave data center ETL receives the ETL cache data, the slave data center ETL may load the ETL cache data into the slave data cluster 132 to bring the slave data cluster 132 up-to-date with respect to the master data cluster 112.

In some embodiments, the ETL state information may include an ETL checkpoint. The ETL checkpoint may indicate a point after which input data received by the parallel ETL has not only been extracted, transformed, and loaded into the parallel ETL but also replicated to the slave data cluster 132. When the slave parallel ETL receives the ETL checkpoint, the slave parallel ETL may repeat the data input operations performed by the master parallel ETL after the checkpoint in order to bring the slave data cluster 132 up-to-date with respect to the master data cluster 112.

According to various embodiments, the ETL state information may be stored within the master data center, within the slave data center, at a third offsite location, or in some combination of the preceding locations. By storing a copy of the ETL state information in a location outside of the master data center, the system may be able to respond gracefully to even catastrophic failure at the master data center because the slave data center can retrieve the ETL state information and use it to reconstruct the state of the data cluster at the master data center.

At 408, the parallel ETL at the master data center is disabled. According to various embodiments, disabling the parallel ETL may involve transmitting an instruction to the parallel ETL 110 to cease functioning. When disabled, the parallel ETL may be deactivated completely or may be placed in an inactive or standby state. When disabled, the parallel ETL may cease loading new data into the data cluster 112.

Figure 5:
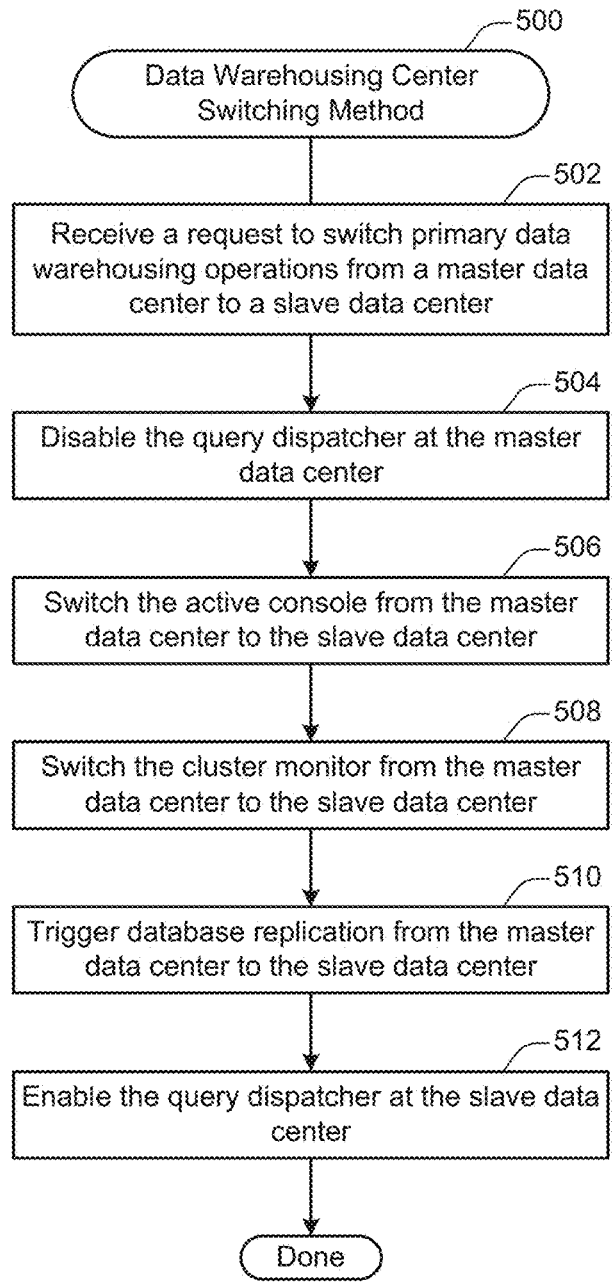
FIG. 5 illustrates a method for switching primary data input and retrieval operations between data centers, performed in accordance with one or more embodiments.

FIG. 5 illustrates a method 500 for switching primary data input and retrieval operations between data centers, performed in accordance with one or more embodiments. According to various embodiments, the method 500 may be performed at a pair of data centers such as the data centers shown in FIG. 1.

According to various embodiments, the master data center may ingest large amounts of data, commonly in the range of petabytes or exabytes, every day. At the same time, the master data center may receive, execute, and respond to any number of queries for the data stored at the data center. Nevertheless, the method shown in FIG. 5 may allow data access and processing operations to be rapidly and gracefully transferred between data centers while maintaining high availability and minimizing or completely avoiding downtime, primary data loss, and query data loss.

In some implementations, the method 500 may be performed in conjunction with the method 400 shown in FIG. 4. For instance, the method 400 may be performed in order to switch the data cluster from the master data center to the slave data center, while the method 500 may be performed in order to transfer other data center operations from the master data center to the slave data center. Alternately, either method may be performed in isolation.

At 502, a request to switch primary data warehousing operations from a master data center to a slave data center is received. According to various embodiments, the request may be generated automatically or manually. For example, the request may be generated automatically when the slave data center detects that the master data center is no longer available. As another example, the request may be generated manually by a systems administrator.

According to various embodiments, the request to switch primary data warehousing operations may be triggered by any of a variety of conditions. For example, a catastrophic failure may render the master data center partially or completely unavailable. As another example, a network failure may render the master data center partially or completely unavailable. As yet another example, the master data center may require comprehensive maintenance or testing during which the master data center would be rendered partially or completely unavailable. As still another example, operations may be switched from the master data center to the slave data center as a precautionary measure, for instance in advance of an impending natural disaster.

At 504, the query dispatcher at the master data center is disabled. As discussed with respect to FIG. 1, the query dispatcher may be responsible for retrieving queries from the database and transmitting each query to a data cluster for execution.

According to various embodiments, the query dispatcher may be disabled to avoid attempting to execute new queries at a data center at which the data cluster may be unavailable.

The query dispatcher may be disabled by transmitting a message to the query dispatcher 106 shown in FIG. 1.

At 506, the active console is switched from the master data center to the slave data center. As discussed with respect to FIG. 1, the active console may be responsible for receiving new queries for accessing data stored on the data clusters in the data centers.

According to various embodiments, the active console may be switched in order to avoid receiving new queries at a data center at which the query dispatcher has been disabled and at which the data cluster may be unavailable. The active console may be switched by transmitting an instruction to both the console 102 and the console 122.

At 508, the cluster monitor is switched from the master data center to the slave data center. As discussed with respect to FIG. 1, the cluster monitor may be responsible for receiving query results from queries that have been executed, monitoring an operating and availability status of the data cluster, and detecting failures in the data cluster.

According to various embodiments, the cluster monitor may be switched in order to begin storing data cluster metadata in the database at the slave data center rather than the master data center. The cluster monitor may be switched by transmitting messages to both the cluster monitor 114 at the master data center and the cluster monitor 134 at the slave data center.

At 510, database replication from the master data center to the slave data center is triggered. According to various embodiments, database replication may involve transmitting data stored on the master database 104 to the slave database 124. For instance, database replication may involve transmitting any information necessary to bring the contents of the slave database up-to-date with respect to the contents of the master database. As discussed with respect to FIG. 1, various types of database replication technologies may be used.

At 512, the query dispatcher at the slave data center is enabled. According to various embodiments, the slave data center may be enabled in order to reactivate data processing operations. The query dispatcher at the slave data center may be enabled by transmitting an instruction to the query dispatcher 126 shown in FIG. 1.

According to various embodiments, various components at the master data center and at the slave data center may be placed in an activated or deactivated state. A deactivated state may be any operating state in which the component is not performing its designated function. For instance, a deactivated component may be unpowered, in a standby mode, asleep, or powered but idle. An activated component may be placed in any state in which it is capable of performing its designated function. A component may be placed in an activated or deactivated state by transmitting a message to the component itself or a controller for the component.

It should be noted that although FIG. 5 refers to one data center as the master data center and another data center as the slave data center, the method 500 shown in FIG. 5 effectively switches the status of the two data centers. That is, after the method 500 is performed, the master data center has become the slave data center, and the slave data center has become the master data center.

Figure 6:
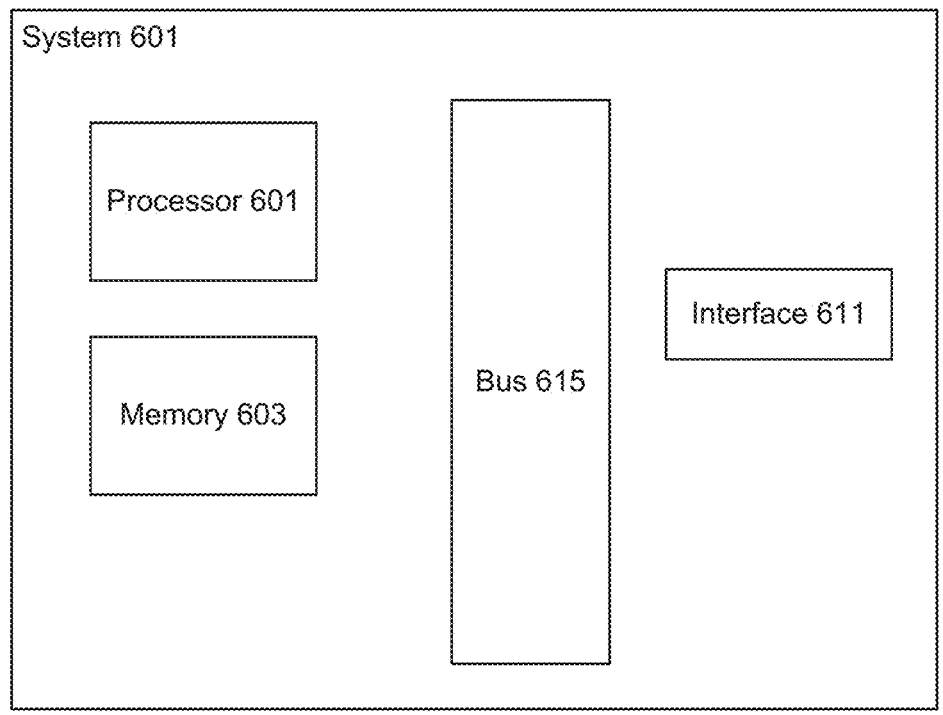
FIG. 6 illustrates an example of a server, configured in accordance with one or more embodiments.

FIG. 6 illustrates one example of a server. According to particular embodiments, a system 600 suitable for implementing particular embodiments of the present invention includes a processor 601, a memory 603, an interface 611, and a bus 615 (e.g., a PCI bus or other interconnection fabric) and operates as a counter node, aggregator node, calling service, zookeeper, or any other device or service described herein. Various specially configured devices can also be used in place of a processor 601 or in addition to processor 601. The interface 611 is typically configured to send and receive data packets over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. Although a particular server is described, it should be recognized that a variety of alternative configurations are possible.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    detecting a failure condition in a data warehouse system, the data warehouse system comprising a first data center and a second data center located in different geographic locations and being in communication via a network,
    wherein the first data center comprises:
        (a) a first data cluster comprising a first plurality of storage servers storing data in a distributed file system,
        (b) a first database configured to store operational information, the operational information comprising:
            query input information comprising one or more queries, and
            information describing an operational status of the first data cluster and an operational status of a second data cluster,
        (c) a first query dispatcher configured to retrieve queries corresponding to the query input information from the first database, and
        (d) a first data ingestion component configured to receive data from one or more data sources, transform the data for storing in the first data cluster, and load the transformed data into the first data cluster;
    wherein the second data center comprises:
        (a) the second data cluster comprising a second plurality of storage servers storing data in a distributed file system, the second data cluster replicating data stored in the first data cluster,
        (b) a second database,
        (c) a second query dispatcher in a disabled state, and
        (d) a second data ingestion component in a disabled state,
    wherein the first query dispatcher is further configured to dispatch the queries for execution in the first data cluster and in the second data cluster based on the operational status of the first data cluster and the operational status of the second data cluster, the first query dispatcher communicating with the second data cluster while the second query dispatcher is disabled, and wherein the failure condition indicates that the first data center is no longer available;

enabling the second data ingestion component at the second data center to receive the data from the one or more data sources, transform the data for storing in the second data cluster, and load the transformed data into the second data cluster;

disabling the first data ingestion component at the first data center;

transmitting a first message to the first query dispatcher at the first data center to disable the first query dispatcher;

replicating the operational information stored in the first database to the second database in the second data center; and transmitting a second message to the second query dispatcher at the second data center to enable the second query dispatcher to retrieve the queries corresponding to the query input information from the second database and dispatch the queries for execution in the second data cluster while the first query dispatcher is disabled.

2. The method recited in claim 1, wherein the operational information also describes a state of the second data cluster.

3. The method recited in claim 1, the method further comprising:

deactivating a first cluster monitor at the first data center, the first cluster monitor configured to monitor the first data cluster and second data cluster, the first cluster monitor further configured to store the operational information in the first database.

4. The method recited in claim 3, the method further comprising:

activating a second cluster monitor at the second data center, the first cluster monitor configured to monitor the second data cluster, the second cluster monitor further configured to store the operational information in the second database.

5. The method recited in claim 1, wherein the operational information describes query status information designating a completion status associated with a query stored in the first database.

6. The method recited in claim 1, wherein the operational information describes a computing load associated with the first data cluster.

7. The method recited in claim 1, the method further comprising:

transmitting data ingestion state information from the first data ingestion component to the second data ingestion component, the data ingestion state information identifying which data has been replicated from the first data cluster to the second data cluster.

8. The method recited in claim 7, wherein the data ingestion state information comprises a checkpoint indicating a break in input data past which the input data has been replicated from the first data cluster to the second data cluster.

9. The method recited in claim 7, wherein the data ingestion state information comprises an input data cache, the input data cache storing data that has not yet been replicated from the first data cluster to the second data cluster.

10. The method recited in claim 1, the method further comprising:

deactivating a first console at the first data center, the first console configured to receive query input information and store the query input information in the first database.

11. The method recited in claim 10, the method further comprising:

activating a second console at the second data center, the second console configured to receive query input information and store the query input information in the second database.

* * * * *